(12) United States Patent
Morris et al.

(10) Patent No.: US 8,468,359 B2
(45) Date of Patent: Jun. 18, 2013

(54) CREDENTIALS FOR BLINDED INTENDED AUDIENCES

(75) Inventors: Cameron Craig Morris, Saratoga Springs, UT (US); Lloyd Leon Burch, Payson, UT (US); Tammy Anita Green, Provo, UT (US)

(73) Assignee: Novell, Inc., Provo, UT (US)

( * ) Notice: Subject to any disclaimer, the term of this patent is extended or adjusted under 35 U.S.C. 154(b) by 1569 days.

(21) Appl. No.: 11/479,876

(22) Filed: Jun. 30, 2006

(65) Prior Publication Data

US 2008/0005573 A1 Jan. 3, 2008

(51) Int. Cl.
- *H04L 9/32* (2006.01)
- *H04L 29/06* (2006.01)
- *G06F 7/04* (2006.01)
- *G06F 15/16* (2006.01)
- *G06F 17/30* (2006.01)
- *G06F 12/00* (2006.01)
- *G06F 12/14* (2006.01)
- *G06F 13/00* (2006.01)
- *G11C 7/00* (2006.01)

(52) U.S. Cl.
USPC ............. 713/180; 713/175; 713/176; 726/5; 726/10; 726/17; 726/18; 726/19

(58) Field of Classification Search
USPC ............. 726/5–10, 16–20; 713/175–181
See application file for complete search history.

(56) References Cited

U.S. PATENT DOCUMENTS

| | | | |
|---|---|---|---|
| 6,014,646 A * | 1/2000 | Vallee et al. | 705/39 |
| 6,446,052 B1 * | 9/2002 | Juels | 705/69 |
| 6,643,774 B1 * | 11/2003 | McGarvey | 713/155 |
| 6,975,727 B1 | 12/2005 | Vandergeest | |
| 7,174,456 B1 * | 2/2007 | Henry et al. | 713/158 |
| 7,210,167 B2 * | 4/2007 | Brezak et al. | 726/18 |
| 7,294,057 B2 * | 11/2007 | Lion et al. | 463/29 |
| 7,536,712 B2 * | 5/2009 | Kaler et al. | 726/5 |
| 2002/0103999 A1 | 8/2002 | Camnisch et al. | |
| 2003/0084302 A1 * | 5/2003 | de Jong et al. | 713/185 |
| 2003/0084311 A1 | 5/2003 | Merrien et al. | |
| 2004/0103317 A1 | 5/2004 | Burns | |
| 2005/0081066 A1 | 4/2005 | Lahdensivu et al. | |
| 2005/0198501 A1 | 9/2005 | Andreev et al. | |
| 2005/0198506 A1 * | 9/2005 | Qi et al. | 713/170 |
| 2005/0257253 A1 | 11/2005 | Ekers et al. | |
| 2006/0161975 A1 * | 7/2006 | Diez et al. | 726/18 |

(Continued)

OTHER PUBLICATIONS

Menezes et al; "Handbook of Applied Cryptography", ISBN 0-8493-8523-7, © 1997.*

(Continued)

*Primary Examiner* — Edan Orgad
*Assistant Examiner* — Jahangir Kabir
(74) *Attorney, Agent, or Firm* — Schwegman, Lundberg & Woessner, P.A.

(57) ABSTRACT

Techniques for creating and using credentials for blinded intended audiences are provided. A principal desires access to a target service. An identity associated with the target service is hidden from an identity service via a random identifier. The identity service supplies an assertion with credentials and the random identifier. The principal sends the assertion and an access message, which also includes the random identifier to the target service. The target service compares the identifier included with the message to the identifier in the assertion and when a match occurs access is permitted to the target service, assuming other credentials associated with the assertion are satisfied as well.

21 Claims, 4 Drawing Sheets

U.S. PATENT DOCUMENTS

2006/0171537 A1* 8/2006 Enright ............... 380/270
2006/0195402 A1* 8/2006 Malina et al. ........... 705/50
2008/0005573 A1* 1/2008 Morris et al. .......... 713/180

OTHER PUBLICATIONS

Houng-Woo and Tai-Yun Kim; Message Recovery Fair Blind Signature, © 1999.*

David Chaum; Blind Signatures for Untraceable Payments, Copyright © 1998.*

Holt, Jason, et al., "nym: practical pseudonymity for anonymous networks", http://www.lunkwill.org/cv/nym.pdf, Pre-Print,(Oct. 2005),1-18.

* cited by examiner

US 8,468,359 B2

CREDENTIALS FOR BLINDED INTENDED AUDIENCES

FIELD

The invention relates generally to security and more particularly to techniques for creating and using credentials for blinded intended audiences.

BACKGROUND

Security is a major concern in today's highly connected economy. Enterprises and individuals are increasing conducting monetary, proprietary, or otherwise personal transactions over the World-Wide Web (WWW) and Internet.

Moreover, it is not just secrecy that is at issue for Internet transactions. For example, malicious users are regularly attempting to infiltrate devices of unsuspecting users to install monitoring devices and/or to unleash viruses. Furthermore, this can occur with Internet transactions that users would not usually view as being private or needing any extra protection.

To address these problems, the industry has generally integrated a number of different approaches into existing WWW browser and email technologies. One approach is to issue certificates that WWW browsers automatically validate for sites being visited by users. Certificates typically have a long life. Consequently, there is an increased chance that certificates can be surreptitiously acquired and used in an unauthorized fashion. Another approach is to use short-term credentials, such as keys that expire upon events or expire after elapsed periods of time.

Short-term credentials are generally distributed by a credential issuer. Short-term credentials rely on the identity of the requestor and rely on the identity of the intended service for which the credentials are being issued. In this manner, access to the intended service requires a credential that identifies the intended service by name and that identifies the requesting user.

However, short-term credentials can also pose a privacy threat for users. This is so; because the credential issuer knows everywhere the user is going on the Internet and can track the user and track usage patterns of the user. A certificate does not experience this problem because with a certificate the user does not have to visit a credential issuer each time access to an intended service is desired. But, a certificate is not service-specific and is long lived so it may be more easily intercepted and acquired by malicious intruders to masquerade on the Internet as the user or even as the intended services that the user desires to access.

Therefore, it is advantageous to provide techniques that retain the benefits of short-term credentials and yet eliminate the privacy threat associated with conventional credential issuers.

SUMMARY

In various embodiments, techniques for creating and using credentials with blinded intended audiences are presented. More specifically, and in an embodiment, a method for creating credentials for a blinded intended service is provided. Initially, a random and unique identifier is acquired and then added to a message. The message is blinded and sent along with another copy of the identifier to an identity service. Next, an assertion and a blinded signature are received for the blinded message; the assertion includes the identifier. The assertion, an unblinded version of the signature, and the message are then sent to a target service that represents the blinded intended service for access.

DETAILED DESCRIPTION

Figure 1:
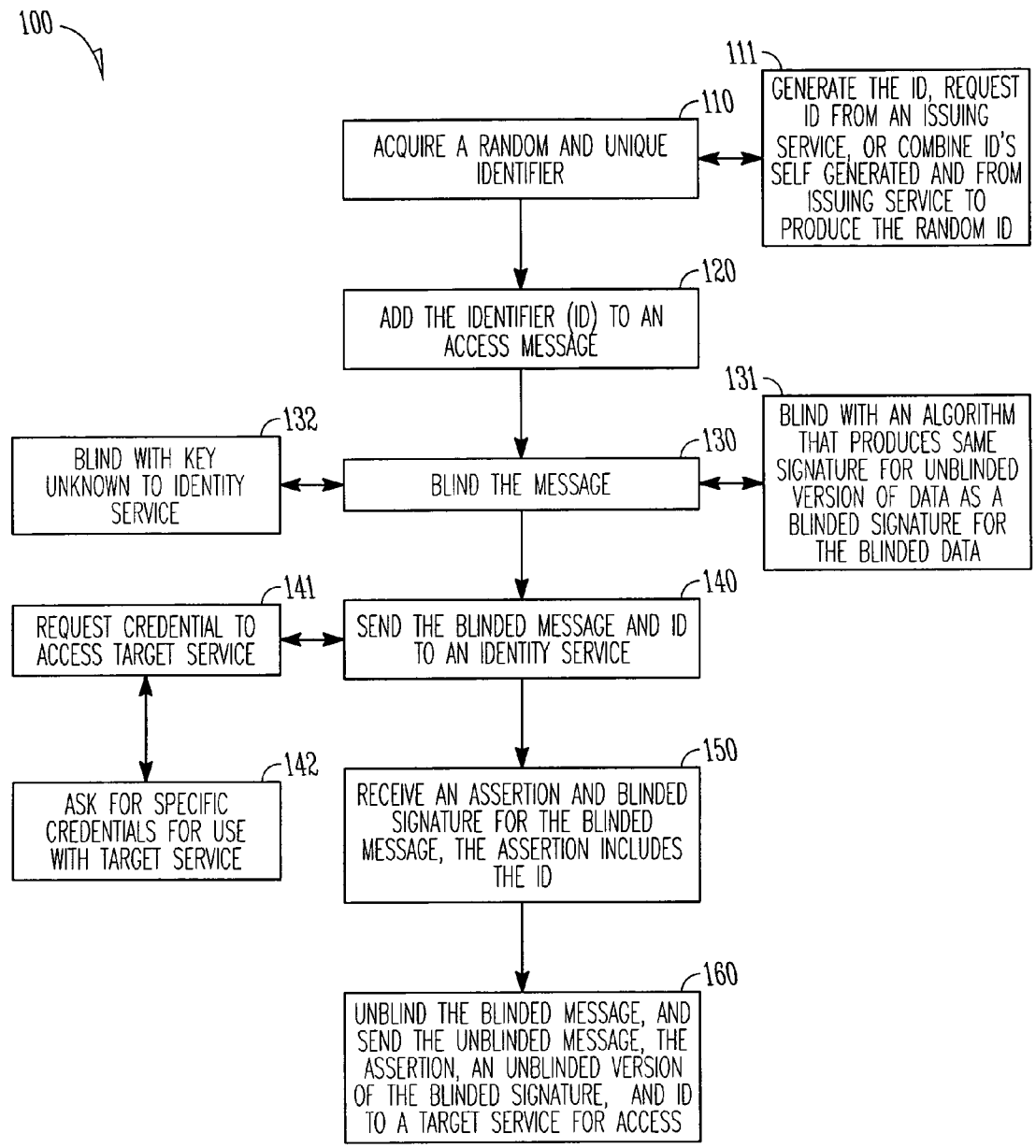
FIG. 1 is a diagram of a method for creating credentials for a blinded intended service, according to an example embodiment.

As used herein a "service" is a type of resource that is accessible over a network. The service is implemented as instructions that when loaded and accessed by a machine performs one or more functions that the service is advertised to perform. A "principal" is another type of resource that may be an automated service, or may logically represent a physical resource within an electronic environment, such as, but not limited to, a user, a device, a group of users, a group of devices, an object, etc.

An "identity service" refers to a special type of service that is designed to manage and supply authentication services and authentication information for principals and for other services. So, an identity service may authenticate a given principal for access to a variety of local and external services being managed by that identity service. A single principal may have multiple identity services.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

A principal is recognized via an "identity." An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a principal across any context that the principal may engage in over a network (e.g., Internet, Intranet, etc.). However, each principal may have and manage a variety of identities, where each of these identities may only be unique within a given context (given service interaction).

As used herein "attributes" may be viewed as types of identifying information, such as, but not limited to, birth date, mother's maiden name, pet's name, last transaction for a given context, age, employment, income level, social-security number (SSN), etc.

The true identity of a principal is typically managed and controlled by an identity service, such as the ones enumerated above. The identity service may also manage the principal's other identities that the principal uses with services for which the principal interacts in a variety of different contexts.

Identifying information and attributes associated therewith may be viewed as credentials associated with a principal. Assertions are supplied by identity services to principals and the assertions include credentials of those principals for accessing principal-desired services.

Various embodiments of this invention can be implemented in existing network architectures. In some cases, the techniques presented herein may be implemented as enhancements to existing services. These enhancements may be integrated into the existing services or accessed externally via Application Programming Interfaces (API's). According to the techniques presented herein are implemented in whole or in part in the Novell® network, client, proxy server products, email products, identity service products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for creating credentials for a blinded intended service, according to an example embodiment. The method 100 (hereinafter "principal service") is implemented in a machine-accessible and readable medium. The principal service is operational over and processes within a network. The network may be wired, wireless, or a combination of wired and wireless.

The principal service processes on behalf of a principal. In an embodiment, the principal service may process within a WWW browser or as a transparent or forward proxy that the principal's WWW browser interacts with either knowingly or unknowingly.

Initially, the principal desires access to a target service or intended service (this may also be referred to as "intended or target audience"). The principal wants to communicate with the target service securely using credentials, such that the communication is valid just between the principal and the target service. But, the principal does not want to disclose to an issuing service, such as an identity service, that the targeted credentials are for the target service. That is, the principal wants to blind the identity service as to the identity of the intended audience, which is the target service.

With this context, the processing of the principal service is now discussed with reference to FIG. 1. At 110, the principal service acquires a random and unique identifier, which the principal service will use to associate with the target service (intended audience).

According to an embodiment, at 111, the random identifier may be acquired or generated in a number of manners. For example, the principal service may manage and generate random identifiers itself independent of any external or third-party service. Alternatively, an issuing service may be used to acquire random identifiers for use by the principal service. The issuing service is not aware of the association between the random identifier that it supplies and the target service; that association is known to just the principal service and is managed by just the principal service. In still other cases, the principal service may generate one random or first identifier and request a second random identifier from an issuing service. This principal service may then combine the two randomly generated identifiers to produce the random identifier that the principal service uses. In some cases, the principal service may acquire or cooperate with the identity service to acquire the random identifier. But, even in these cases, the identity service is not aware of the association between the random identifier and the target service.

At 120, the principal service adds the random identifier to an access message request. The access message is a message that the principal service will subsequently present to the target service to gain access to resources of the target service. The access message may also include a target service or resource identifier in addition to the random identifier and the request for access.

At 130, the principal service blinds the message. The blinded message includes the random identifier and the target service or resource identifier. Just the principal service retains the ability to decrypt the blinded message.

In an embodiment, at 131, the principal service uses a blinding algorithm. In this manner, the identity service may supply a signature for the blinded message and the principal service may unblind that signature associated with the blinded message to produce a new version of the signature that will match a signature that may be generated for the unblinded message or native message.

At 132, the principal service uses its own key to blind the message and that key is not shared to others for purposes of decrypting the message. So, the principal service blinds with a key that is unknown to an identity service with which the principal service will subsequently interact in the manners discussed below.

At 140, the principal service sends the blinded message and a copy of the random identifier to an identity service. Examples or identity services were supplied above and incorporated by reference herein. In some embodiments, the identity service may be an enhanced credentialing service that is designed to accommodate the processing discussed herein.

At 141, the principal service also makes a request for a credential. That is, the principal service wants the identity service to supply it a credential for accessing the target service, but the identity service is not aware of the identity of the target service. All the identity service has is the random identifier and a blinded message that it may not inspect.

According to an embodiment, at 142, the request may ask for specific credentials for use with the target service. So, the principal service may inform the identity service of the attributes that it has to have to access the target service without disclosing the identity of the target service. Typically, the attributes would be resolved for a principal based on the identity of the principal and the identity of the target service, but here the identity service is unaware of the identity of the target service. So, the principal service may specifically instruct the identity service as to the credentials and attributes that it wants for a subsequent use unknown to the identity service but known to the principal service as being for access to the target service.

At 150, the principal service receives an assertion and signature back from the identity service. The assertion includes the random identifier. The assertion also includes the credentials that the principal has to have to authenticate to the target service, which the principal service requested. The signature is produced by the identity service for the blinded message data. Moreover, the assertion itself may be signed by the identity service. The signature associated with the blinded message data is unblinded by the principal service.

Subsequently, at 160, the principal service unblinds the blinded message and sends the message, which has the random identifier and a target service identifier, along with the assertion and an unblinded version of the signature of the blinded message to the target service for access.

Example processing associated with how a front-end service of a target service may process this information to validate access to its resources is provided below with respect to the method 300 and FIG. 3. Moreover, example processing with respect to the identity service is presented below with respect to the method 200 and FIG. 2.

Essentially, the principal service has acquired credentials that are specifically directed to a target service for purposes of gaining secure access to that target service from a credentialing service. The credentialing service provides the credentials without being aware of the identity of the target service. So, the credentialing service cannot profile or track the activities of a requesting principal that interacts with its principal service. This provides privacy and yet retains the benefits of service-specific credentialing.

Figure 2:
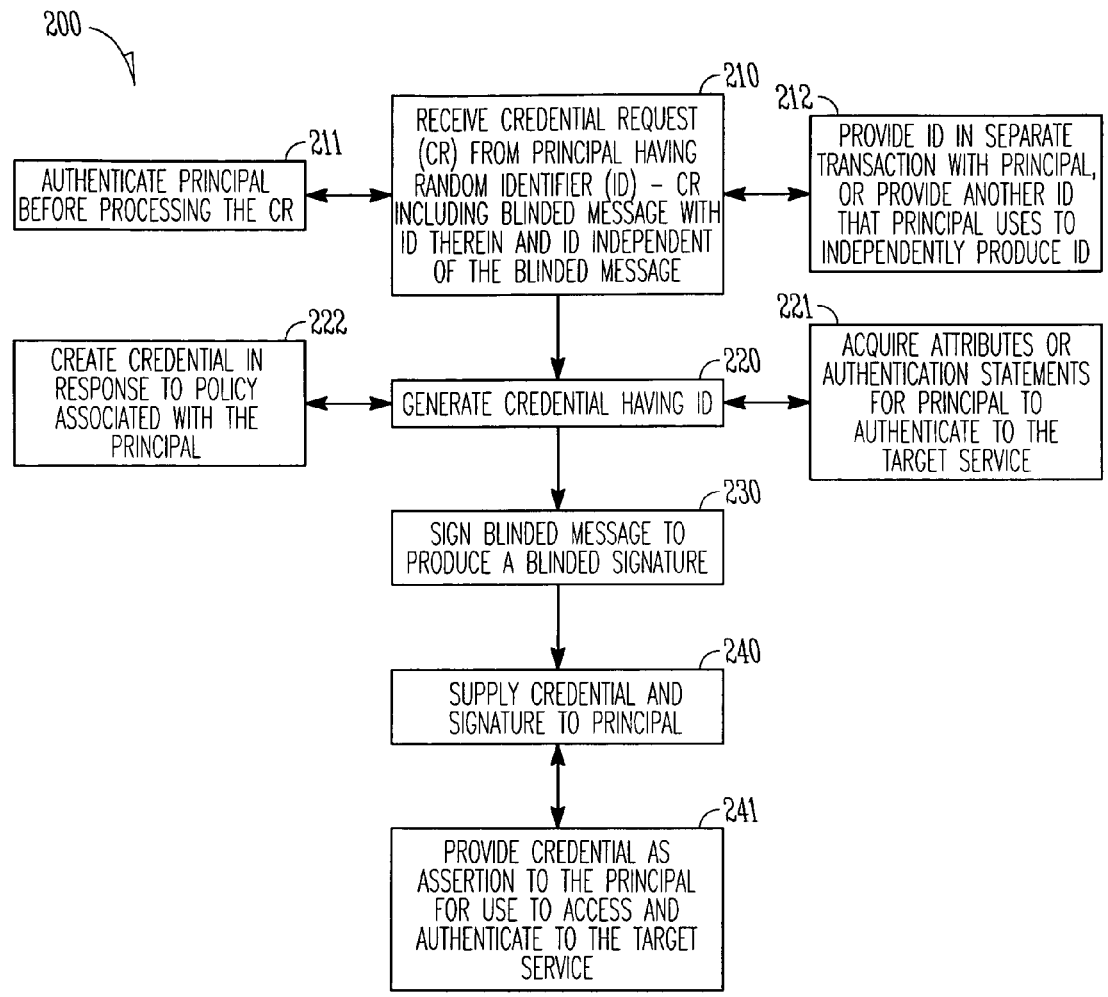
FIG. 2 is a diagram of another method for creating credentials for a blinded intended service, according to an example embodiment.

FIG. 2 is a diagram of another method 200 for creating credentials for a blinded intended service, according to an example embodiment. The method 200 (hereinafter "identity service") is implemented in a machine-accessible and readable medium and is operational over a network. The network may be wired, wireless, or a combination of wired and wireless. According to an embodiment, the identity service cooperates with the principal service represented by the method 100 of the FIG. 1 to create credentials that a principal may user use with a target service to gain access to its resources in a manner that the credentials mask, blind, or hide the identity of the target service.

The identity service may be viewed as an enhanced credentialing service that is designed to supply credentials for random identifiers associated with unknown services for known and authenticated principals. The identity service may also sign messages that it cannot view (essentially a blinded signature), and may also sign the credentials it supplies. That is, the identity service signs blinded messages sent by a principal via its principal service. The example interaction and processing associated with a principal service was supplied in detail above with respect to the method 100 of the FIG. 1.

At 210, the identity service receives a credential request from a principal. The credential request includes a random identifier supplied by the principal and a blinded message, which the identity service is unable to view or inspect. The blinded message also includes the random identifier and a target service identifier or resource identifier. The identity service cannot view the target service identifier but it assumes that it is present in the blinded message and is being actively hidden from the identity service for privacy purposes.

According to some embodiments, at 211, if the principal is not already authenticated when contacting the identity service with the credential request, then the identity service authenticates the principal for access. The identity service and principal are in a trusted and secure relationship with one another.

In yet more embodiments, at 212, the identity service may have previously provided the random identifier that was included with the credential request to the principal during previous interactions with the principal. This may have occurred via a separate transaction entirely with the principal. Alternatively, the identity service may have supplied a first random identifier and the principal used its own second random identifier or another mechanism to derive the random identifier. The point is, the identity service may supply or assist in supplying the random identifier to the principal; but, the identity service is not aware of the association between the random identifier and the target service with which the principal desires to access with a credential-service specific access mechanism.

At 220, the identity service generates a credential having the random identifier included therein. In some cases, at 221, this may entail acquiring attributes and/or authentication statements for the principal, which the principal will subsequently use to authenticate to and gain access with the target service and its resources. At 222, the credential may also be created and circumscribed by policy that is associated with the principal and managed by the identity service.

At 230, the identity service signs the blinded message that accompanied the credential request and essentially produces a blinded signature for the blinded message. The credential and signature are used by the principal to gain access to and authenticate with the target service, which the identity service is unaware of. In some cases, the identity service may also sign the credential in addition to signing the blinded message provided by the principal.

At 240, the identity service supplies the credential and the blinded signature of the blinded message back to the principal. In some cases, at 241, this is provided as an assertion to the principal for authenticating and accessing the target service. Example interactions of the principal via its principal service were presented above with respect to the discussion of the method 100 and the FIG. 1. The processing associated with the front end of the target service that interacts with the principal or principal service is presented below with respect to the method 300 and the FIG. 3.

Figure 3:
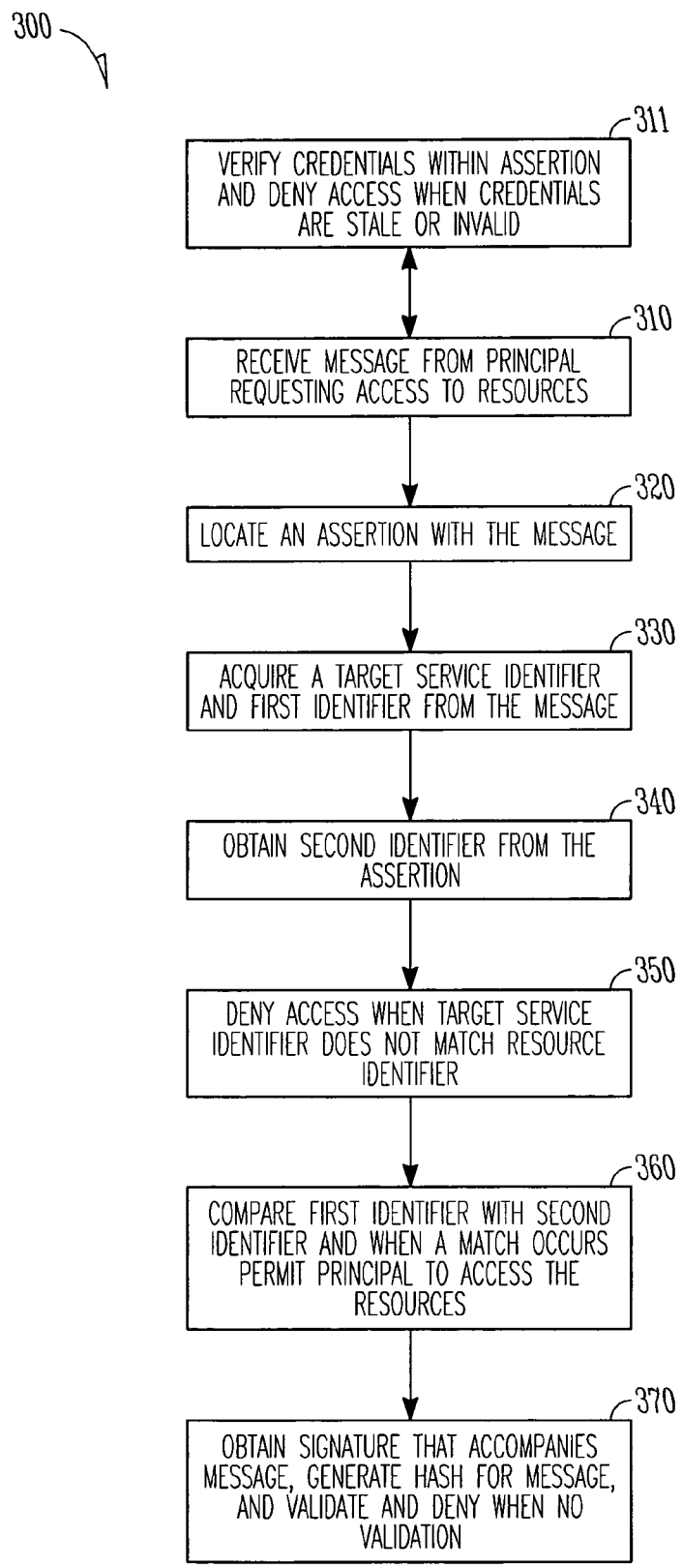
FIG. 3 is a diagram of a method of using credentials created for a blinded intended service, according to an example embodiment.

FIG. 3 is a diagram of a method 300 of using credentials created for a blinded intended service, according to an example embodiment. The method 300 (hereinafter "front-end service or a target service" or "front-end service") is implemented in a machine-accessible and readable medium and is accessible over a network. The network may be wired, wireless, or a combination of wired and wireless. According to an embodiment, the front-end service represents processing used at the front end of a target service to verify credentials created by the principal service and the identity service represented by the methods 100 and 200 of the FIGS. 1 and 2, respectively.

The front-end service may be implemented as a wrapper or reverse proxy for the target service. That is, the front-end service need not be integrated into the legacy code associated with any given target service; rather, the front-end service may transparently be integrated into an environment of a legacy target service as a wrapper or reverse proxy that intercepts initial communications requesting access to resources of the target service.

At 310, the front-end service receives an unblinded or native format message from a requesting principal to access one or more of its resources. This message is accompanied with a variety of credentials. Accordingly, at 311, the front-end service verifies initial credentials included within an assertion supplied by an identity service on behalf of the principal. That is, the identity service, such as the identity service discussed above with respect to the method 200 of the FIG. 2, supplied an assertion to the principal and the principal presents that assertion to the front-end service to authenticate for initial access to the resources controlled by the front-end service. If the credentials are stale or invalid at the time presented by the principal, then the front-end service denies access to the resources.

At 320, the front-end service locates the assertion associated with the message requesting access. This assertion will include a variety of information that the front-end service may want to inspect and verify before full access to the resources of the front-end service is provided to the requesting principal. One piece of information is a random identifier that, as will be seen below, the front-end service will use to ensure it is the proper recipient of the access message request.

At 330, the front-end service acquires a target service identifier and a first identifier from the message. The message is not blinded when supplied by the principal as it was when it was sent to the identity service by the principal for purposes of acquiring the assertion and an initial message signature.

At 340, the front-end service obtains a second identifier from the assertion. At this point, the front-end service has three identifiers: two acquired from the message and one acquired from the assertion. The two acquired from the message include the target service identifier and, if all is proper, a copy of the identifier acquired from the assertion. The identifier in the assertion is a random identifier that up until this point in time only the principal knew to be associated with the target service identifier.

At 350, the front-end service denies access to the resources when the target service identifier does not match one of its resource identifiers. That is, the front-end service verifies that the target service that the principal is requesting is within its purview and known to the front-end service. If this is not the case, then access to the resources are denied.

At 360, the front-end service compares the first identifier acquired from the assertion to the second identifier included in the access message. When there is a match the request for access to the resource may proceed. When there is not a match then access to the resources is denied.

In an embodiment, at 370, the front-end service may also obtain a signature that accompanied the assertion and access request message. The signature was initially generated by the identity service for a blinded version of the access request message. Subsequent to that the principal unblinded the blinded version of the signature and the version received with the message by the front-end service is unblinded. The front-end service then proceeds to generate its hash for the access request message in its native format (unblinded or native format). The unblinded first signature and independently generated hash are compared with one another and if they do not match access to the resources of the target services may be denied. Recall that the blinding algorithm used by the principal may be one in which an unblinded signature is the same as a signature for a native version of a message.

It has now been demonstrated how a variety of processing may be used to create and use credentials for blinded intended audiences. This processing retains the benefits of service-specific credentials and eliminates the privacy concerns associated with acquiring credentials from a credential issuer, since at no time is the credential issuer (identity service) aware of the identity of the intended audience (target service).

It is also noted that the methods 100, 200, and 300 of the FIGS. 1-3, respectively may be implemented in some embodiments as instructions. The instructions when accessed by a machine produce the processing of the methods as depicted in the FIGS. 1-3 and as described above. The instructions may be initially housed on removable media and subsequently interfaced to a machine for processing. Alternatively, the instructions may be prefabricated within memory and/or storage of a machine. In still more cases, the instructions may be downloaded from one network machine to another network machine.

It should also be noted that in some cases the term "blinded" may be used interchangeably with "encrypted" and the term "unblinded" may be used interchangeably with "decrypted." The cases where this is not appropriate is where the blinded signature is unblinded; although if an algorithm were subsequently developed such that a signature for encrypted data would match a signature for the decrypted data then the terms in question may be used interchangeably in every case.

Figure 4:
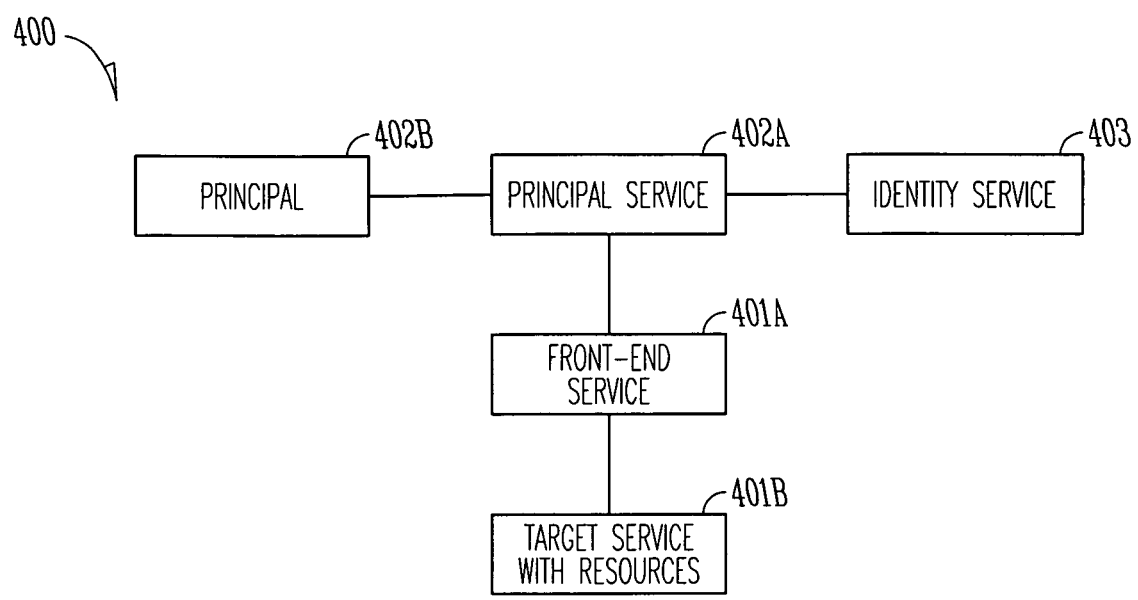
FIG. 4 is a diagram of a blinded intended service credentialing system, according to an example embodiment.

FIG. 4 is a diagram of a blinded intended service credentialing system 400, according to an example embodiment. The blinded intended service credentialing system 400 is implemented in a machine-accessible and readable medium and is accessible over a network. The network may be wired, wireless, or a combination of wired and wireless. The processing of the blinded intended service credentialing system 400 implements, among other things, the processing of methods 100, 200, and/or 300 depicted in the FIGS. 1-3, respectively.

The blinded intended service credentialing system 400 includes a front-end service 401, a principal service 402, and an identity service 403. Each of these and their interactions with one another will now be discussed in greater detail.

The front-end service 401 is implemented as a wrapper or reverse proxy associated with a target service. The target service and its resources may be viewed as a blinded intended audience, because it is the intended service of a requesting principal and the identity of the target service is unknown to or blinded from the identity service 403. The interactions of the front-end service 401 were presented above with respect to the method 300 of the FIG. 3. The front-end service 401 interacts with the principal service 402.

The front-end service 401 is to receive and process access request messages for resources associated with a target service. To do this, the front-end service 401 authenticates requestors and verifies other credentialing information. A principal supplies an access request message via the principal service 402. The access request message includes a target or resource identifier and a random identifier. If the target or resource identifier does not match what is known to the front-end service 401, then access is denied to the resources.

If the target or resource identifier does match what is known to the front-end service 401, then the front-end service 401 acquires another version of the random identifier from an assertion originally created by the identity service 403 on behalf of the principal and supplied to the front-end service 401 from the principal service 402 with the access request message. If the random identifier included in the assertion does not match the random identifier included with the access request message, then the front-end service 401 denies access to the resources of the target service. If there is a match, then access is permitted or may continue with additional verification.

According to an embodiment, the additional verification performed by the front-end service 401 may include validating a signature that accompanies the assertion believed to be from by the identity service 403 for the access request message against an independent hash generated for the access request message by the front-end service 401. If a match occurs access to the resources is permitted, if not access is denied. The signature initially supplied by the identity service 403 was for a blinded version of the access request message. The principal service 402 then unblinds the signature and that is what the front-end service 401 validates.

The front-end service 401 may also invalidate or deny access if credentials supplied in the assertion by the principal become stale or invalid. So, if a principal waits too long or logs out of a browser session, as one example, the credentials supplied to the front-end service 401 may be determined to be stale by the front-end service and access may be denied. The front-end service 401 may also actively and in real-time monitor credentials as the principal accesses the resources of the target service.

The principal service 402 operates on behalf of a requesting principal from within an environment of that principal. In some cases, the principal service 402 may be integrated within a WWW browser of the principal or may be a transparent or forward proxy of the principal and its interactions with the Internet. Example processing associated with the principal service 402 was presented above with respect to the method 100 of the FIG. 1.

The principal service 402 manages, acquires, and perhaps independently generates random and unique identifiers. The identifiers are each associated with a specific target service. The principal service 402 blinds the access request message that is ultimately going to be sent to the front-end service 401 for purposes of gaining access to resources of a desired target service and its resources. The access request message includes a random identifier and a target or resource identifier. The blinded message is sent to an identity service 403 for purposes of acquiring credentials to access the target service. The blinded message is also accompanied with a copy of the random identifier. The identity service 403 supplies back credentials via an assertion and a signature for the blinded access request message. The principal service 402 forwards that along to the front-end service 401 after unblinding the signature for purposes of gaining access to the resources of the target service.

The identity service 403 receives credential requests from the principal via the principal service 402 and in response generates an assertion having the credentials and a blinded signature for the blinded version of the access request message supplied by the principal service 402. The assertion includes the random identifier. The identity service 402 is unaware of the identity of the target service or the resources. The identity service 402 knows about and processes the random identifier but does not know of the association between the random identifier and the target service or its resources.

The identity service 403 may also dole out random identifiers to requesting principals or may assist the principals in generating the random identifiers. The identity service 403 also signs the blinded access request message supplied by the principal service 402 but is unaware of its contents and cannot inspect or view the message.

It is also noted that the assertion can be a represented in different formats by the identity service 403. For example, the assertion may be a Kerberos ticket, etc.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method that executes on a machine, comprising:
   generating, by the machine, a random and unique identifier, the machine maintains an association between the identifier and a target service that the machine is to interact with and the association is only known by and only managed by the machine;
   blinding, by the machine, the message, the blinding ensures the message is encrypted; sending, by the machine, the blinded message and a copy of the identifier to an identity service, the identity service incapable of decrypting the blinded message and incapable of identifying the association between the identifier and the target service;
   receiving, by the machine, an assertion and blinded signature for the blinded message from the identity service, wherein the assertion includes the identifier, the assertion for authenticating the machine for access to the resource of the target service, the identity service remains unaware of access between the machine and the target service and remains unaware of an identity for the target service, and the identity service is not involved in the interactions between the machine and the target service and is unaware of the target service, the identity service cannot profile or track activities of the machine and provides service-specific credentialing to the machine for access to the resource via the assertion and this is done without the identity service having knowledge of the identity for the target service that controls the resource;
   unblinding, by the machine, the blinded message and the blinded signature; and
   sending, by the machine, the unblinded message, the identifier, the unblinded signature, and the assertion to a target service for access to a resource of the target service.

2. The method of claim 1, wherein blinding further includes blinding the message with an algorithm that permits an unblinded signature on signed data that was blinded to equal another signature on an unblinded version of the blinded data.

3. The method of claim 1, wherein blinding further includes blinding the message with a key unknown and unavailable to the identity service.

4. The method of claim 1, wherein sending further includes requesting a credential for access to the target service, wherein the credential is requested from the identity service, and wherein the assertion is the requested credential.

5. The method of claim 4, wherein requesting further includes asking for the credential to include specific credentials for use with the target service.

6. A machine-implemented method to execute on a machine, comprising:
   receiving, by the machine, a credential request from a principal, the credential request includes a random identifier that identifies a target service known to the principal, the association of the random identifier to the target service is known to just the principal and is managed and generated by only the principal, and the credential request also includes a blinded message having another copy of the random identifier and a target service identifier that identifies the target service, the inclusion of the copy of the random identifier with the target service identifier in the blinded message makes the association for the random identifier to be associated with the target service, the blinded message is encrypted and incapable of being decrypted except by the principal, both the copy of the random identifier and the target service identifier are blinded and hidden within the blinded message only the principal knows the contents of the blinded message, the machine cannot view the target service identifier and remains unaware of the association of the random identifier to the target service;

generating, by the machine, a credential in response to the request, the credential includes the random identifier;

signing, by the machine, the blinded message to produce a blinded signature for the blinded message, the blinded signature representing a signature for an encrypted version of the blinded message since the blinded message is encrypted and only capable of being decrypted by the principal; and supplying, by the machine, the credential and the blinded signature to the principal for use in accessing a particular service known to the principal only and the particular service remains unknown to the machine, where that particular service is the target service, and the machine is not involved in subsequent interactions between the principal and the particular service and is unaware of the random identifier's association with the target service, the credential provided by the principal to the target service for authentication by the target service without involvement of the machine.

7. The method of claim 6 further comprising, authenticating, by the machine, the principal before receiving the credential request.

8. The method of claim 6, wherein generating further includes acquiring at least one of attributes and authentication statements for the principal to authenticate to the target service in response to information included in the credential request, wherein the information identifies the attributes and the authentication statements.

9. The method of claim 6, wherein generating further includes creating the credential in response to policy associated with the principal.

10. The method of claim 6, wherein supplying further includes providing the credential as an assertion to the principal that the principal subsequently forwards to the target service along with an unblinded version of the message to gain access to the target service.

11. A machine-implemented method to execute on a machine, comprising:

receiving, by the machine, a message from a principal requesting access to one or more resources, the message in a decrypted format;

locating, by the machine, an assertion associated with the message;

acquiring, by the machine, a target service identifier from the message and a first random identifier;

obtaining, by the machine, a second random identifier from the assertion;

denying, by the machine, access when the target service identifier does not match a resource identifier associated with the one or more resources; and comparing, by the machine, when the target service identifier matches the resource identifier, the first random identifier with the second random identifier, and when a match occurs permitting the principal to access the one or more resources, the second random identifier supplied by an identity service to the principal in a previous transaction where the principal supplied an encrypted version of the message to the identity service, the encrypted version is incapable of being decrypted by the identity service, and the identity service is unaware of the subsequent interactions between the principal and the machine and is unaware of the target service identifier being associated with the one or more resources, the target service identifier is: generated by the principal, managed by only the principal, and the association between the target service identifier and the one or more resources is known to just the principal; the machine representing a proxy for a target service associated with the target service identifier and the target service is unknown to the identity service when the identity service interacts with the principal, the identity service provides the second random identify as a credential used by the principal to authenticate with the target service, the target service authenticating to provide access.

12. The method of claim 11 further comprising:

obtaining, by the machine, a signature that accompanies the message;

generating, by the machine, a hash for the message; and validating, by the machine, the signature and the hash and when there is not a validation denying the principal access to the one or more resources.

13. The method of claim 11, wherein receiving further includes verifying credentials included with the assertion and denying the principal access to the one or more resources when the credentials are stale or invalid.

14. A machine-implemented system, comprising:

a machine having a front-end service to a target service, the front-end service executes on the machine as executable instructions residing in a non-transitory computer-readable storage medium and the front-end service is configured as a reverse proxy to the target service;

the machine also having a principal service, the principal service executes on a machine as executable instructions residing in a non-transitory computer-readable storage medium; and the machine further having an identity service, the identity service executes on a machine as executable instructions residing in a non-transitory computer-readable storage medium, and the principal service is to interact with the identity service to acquire an assertion to access the target service, the target service unknown to the identity service, and the identity service is to generate the assertion by including credentials, for a principal associated with the principal service to access the target service, and by including a first random identifier generated by the principal service, which only the principal associates with the target service and which is only managed by the principal service the first random identifier included within the assertion, and the association of the first random identifier to the target service remains unknown to the identity when interacting with the principal, and the identity service receives from the principal service an encrypted version of a message that the identity service cannot decrypt, the encrypted version of the message including a target service identifier for the target service and a copy of the first random identifier identified as a second random identifier, the principal service is the to supply the second random identifier and the target service identifier with the message in decrypted format from the encrypted version to access the target service and is to present that to the front-end service along with the assertion, and the front-end service is to compare the second random identifier of the message to the first random identifier of the assertion and when a match occurs access to the target service is to be permitted, and the identity service remains unaware of subsequent interactions between the principal and the target service and the identity service remains unaware of the association between the first random identifier and the target service, the identity service provides the second random identify as a credential used by the principal to authenticate with the target service, the target service authenticating to provide access.

15. The system of claim 14, wherein the identity service is to generate a blinded signature for the encrypted version of the message that the principal service supplies to the identity service and the identity service includes the blinded signature with the assertion supplied to the principal service.

16. The system of claim 15, wherein the front-end service is to validate a second signature for that message, wherein the second signature is produced by the principal service as an unblinded signature.

17. The system of claim 14, wherein the principal service is to generate the first random identifier and is to supply the first random identifier to the identity service.

18. The system of claim 14, wherein identity service is unaware of an identity associated with the target service when supplying the assertion.

19. The system of claim 14, wherein the front-end service is to verify the credentials of the principal before granting access to the target service.

20. The system of claim 19, wherein the front-end service is to revoke access to the target service when one or more of the credentials become stale or invalid.

21. The system of claim 14, wherein the assertion is represented as a Kerberos ticket.

* * * * *

UNITED STATES PATENT AND TRADEMARK OFFICE
CERTIFICATE OF CORRECTION

PATENT NO. : 8,468,359 B2  Page 1 of 1
APPLICATION NO. : 11/479876
DATED : June 18, 2013
INVENTOR(S) : Morris et al.

It is certified that error appears in the above-identified patent and that said Letters Patent is hereby corrected as shown below:

On the Title Page

In column 2, under Item [56] "Other Publications", line 1, delete "al;" and insert --al.;--, therefor On page 2, in column 1, under Item [56] "Other Publications", line 1, delete "Message" and insert --"Message--, therefor On page 2, in column 1, under Item [56] "Other Publications", line 1-2, delete "Signature," and insert --Signature",--, therefor On page 2, in column 2, under Item [56] "Other Publications", line 1, delete "Blind" and insert --"Blind--, therefor On page 2, in column 2, under Item [56] "Other Publications", line 1, delete "Payments," and insert --Payments,"--, therefor On page 2, in column 2, under Item [56] "Other Publications", line 4, delete "Print,(" and insert --Print, (--, therefor On page 2, in column 2, under Item [56] "Other Publications", line 5, delete "2005),1" and insert --2005), 1--, therefor In the Claims Column 10, line 10, in claim 1, after "encrypted;", insert --¶--, therefor Column 12, line 18, in claim 12, delete "hash" and insert --hash,--, therefor Column 12, line 56, in claim 14, after "is", delete "the", therefor Signed and Sealed this
Third Day of June, 2014

Michelle K. Lee
*Deputy Director of the United States Patent and Trademark Office*